US012700795B2

(12) United States Patent
Lin et al.

(10) Patent No.: US 12,700,795 B2
(45) Date of Patent: Aug. 4, 2026

(54) CONVERSION CONTROL CIRCUIT AND METHOD FOR USE IN STACKABLE MULTIPHASE POWER CONVERTER

(71) Applicant: Richtek Technology Corporation, Hsinchu (TW)

(72) Inventors: Chen-Yun Lin, Hsinchu (TW); Wei-Chuan Wu, Hsinchu (TW); Ping-Ching Huang, Hsinchu (TW); Chih-Hao Yang, Hsinchu (TW); Li-Wen Fang, Hsinchu (TW)

(73) Assignee: Richtek Technology Corporation, Hsinchu (TW)

( * ) Notice: Subject to any disclaimer, the term of this patent is extended or adjusted under 35 U.S.C. 154(b) by 70 days.

(21) Appl. No.: 19/015,650

(22) Filed: Jan. 10, 2025

(65) Prior Publication Data

US 2025/0385597 A1    Dec. 18, 2025

Related U.S. Application Data

(60) Provisional application No. 63/660,574, filed on Jun. 17, 2024.

(30) Foreign Application Priority Data

Nov. 14, 2024    (TW) ................................. 113143734

(51) Int. Cl.
H02M 1/32       (2007.01)
H02M 1/00       (2006.01)
H02M 3/158      (2006.01)

(52) U.S. Cl.
CPC ........... *H02M 1/32* (2013.01); *H02M 1/0032* (2021.05); *H02M 1/325* (2021.05); *H02M 3/1584* (2013.01); *H02M 3/1586* (2021.05)

(58) Field of Classification Search
CPC ...... H02M 1/32; H02M 1/0032; H02M 1/325; H02M 3/1584; H02M 3/1586
See application file for complete search history.

(56) References Cited

U.S. PATENT DOCUMENTS 7,368,959 B1 *  5/2008  Xu ...................... H02M 3/1584
                                                          327/540
8,710,810 B1 *  4/2014  McJimsey ............. H02M 3/158
                                                          323/283

(Continued)

*Primary Examiner* — Yusef A Ahmed
(74) *Attorney, Agent, or Firm* — Huan-Yi Lin

(57)                ABSTRACT

A conversion control circuit for controlling a stackable multiphase power converter, wherein the stackable multiphase power converter includes plural stackable sub-converters, each of which includes a power stage circuit and a conversion control circuit. The conversion control circuit includes: a synchronization terminal, through which a synchronization signal is transmitted and received among the plurality of synchronization terminals of the plural conversion control circuits; and a fault indication signal or status, where plural pulses of the synchronization signal have a fault indication status. When at least one of the plural stackable sub-converters experiences a fault, the fault indication signal or status indicates and controls the conversion control circuit to enter a fault operation. The fault operation includes: the fault indication signal or the fault indication status disables a faulty one of the plural stackable sub-converters, and one of the non-faulty ones among the plural stackable sub-converters takes over.

21 Claims, 11 Drawing Sheets

(56) References Cited

U.S. PATENT DOCUMENTS

| | | | | |
|---|---|---|---|---|
| 9,912,240 B1 * | 3/2018 | Nguyen | .................. | H02M 1/36 |
| 2004/0041543 A1 * | 3/2004 | Brooks | .............. | H02M 3/1584 |
| | | | | 323/212 |
| 2004/0208029 A1 * | 10/2004 | Caruthers | .............. | H02J 1/102 |
| | | | | 363/72 |
| 2007/0110203 A1 * | 5/2007 | Mizutani | ........... | H03H 17/0628 |
| | | | | 375/355 |
| 2011/0025284 A1 * | 2/2011 | Xu | ...................... | H02M 3/1584 |
| | | | | 327/294 |
| 2013/0181530 A1 * | 7/2013 | Deboy | ................... | H02J 3/381 |
| | | | | 307/82 |
| 2014/0266111 A1 * | 9/2014 | Lee | .................... | H02M 3/1584 |
| | | | | 323/282 |
| 2015/0188406 A1 * | 7/2015 | Nishi | ................... | H02M 3/156 |
| | | | | 323/217 |
| 2016/0315538 A1 * | 10/2016 | Nguyen | .............. | H02M 3/1584 |
| 2021/0028683 A1 * | 1/2021 | Jiang | .................... | H02M 1/084 |
| 2021/0028686 A1 * | 1/2021 | Jiang | .................. | H02M 3/1584 |
| 2021/0028704 A1 * | 1/2021 | Jiang | .................. | H02M 3/1584 |
| 2021/0159809 A1 * | 5/2021 | Asanuma | .......... | H02M 7/53871 |
| 2021/0288578 A1 * | 9/2021 | Luo | ....................... | H02M 1/088 |
| 2021/0288579 A1 * | 9/2021 | Luo | ..................... | H02M 1/0845 |
| 2021/0288580 A1 * | 9/2021 | Luo | ..................... | H02M 3/1584 |
| 2022/0038008 A1 * | 2/2022 | Wu | ....................... | H02M 1/088 |
| 2022/0093061 A1 * | 3/2022 | Liu | ........................ | G09G 5/006 |
| 2022/0271668 A1 * | 8/2022 | Hsiao | ...................... | H02M 1/08 |
| 2022/0321013 A1 * | 10/2022 | Chen | ................... | H02M 1/088 |
| 2023/0110617 A1 * | 4/2023 | Yang | ................... | H02M 3/157 |
| | | | | 323/266 |
| 2023/0238875 A1 * | 7/2023 | Yang | ................... | H02M 3/1586 |
| | | | | 363/13 |
| 2024/0055986 A1 * | 2/2024 | Banappagol | ........ | H02M 3/1586 |
| 2024/0063720 A1 * | 2/2024 | Yang | ............. | H02M 1/088 |
| 2024/0072671 A1 * | 2/2024 | Hu | ...................... | H02M 1/0009 |
| 2024/0088791 A1 * | 3/2024 | Hosotani | ............ | H02M 3/1584 |
| 2024/0186900 A1 * | 6/2024 | Zhang | .................. | H02M 3/157 |
| 2025/0062695 A1 * | 2/2025 | Narula | .................. | H02M 1/32 |
| 2025/0079984 A1 * | 3/2025 | Wu | .................... | H02M 3/1584 |
| 2025/0132682 A1 * | 4/2025 | Tan | .................... | H02M 3/1586 |
| 2025/0286461 A1 * | 9/2025 | Zhang | .................. | H02M 3/01 |
| 2026/0012097 A1 * | 1/2026 | Lin | .................... | H02M 3/1584 |

* cited by examiner

VO

Enable signal
of faulty phase

Inductor current

Fault occurs

Time

CONVERSION CONTROL CIRCUIT AND METHOD FOR USE IN STACKABLE MULTIPHASE POWER CONVERTER

CROSS REFERENCE

The present invention claims priority to the provisional application Ser. No. 63/660,574, filed on Jun. 17, 2024 and claims priority to the TW patent application Ser. No. 113143734, filed on Nov. 14, 2024.

BACKGROUND OF THE INVENTION

Field of Invention

The present invention relates to a conversion control circuit, particularly to a conversion control circuit for a stackable multiphase power converter. The present invention also relates to a control method for controlling the stackable multiphase power converter.

Description of Related Art

A stackable multiphase power converter provides high-performance DC/DC power conversion to meet the demands of high load currents and rapid transient response. Therefore, stackable multiphase power converters are widely used in high-performance computing (HPC) applications, such as CPUs, GPUs, and artificial intelligence. As the load current increases, the number of phases in the stackable multiphase power converter increases. Conversely, during light load conditions, the number of phases decreases to save power.

FIG. 1A shows a prior art stackable multiphase power converter: U.S. Pat. No. 11,081,954, titled "Phase shedding control method used in multiphase switching converters with daisy chain configuration." The prior art employs a daisy chain topology to control the stackable multiphase power converter.

FIG. 1B shows the corresponding operational waveforms of the prior art shown in FIG. 1A. As shown in FIG. 1B, one drawback of the prior art is that when one phase of the stackable multiphase power converter encounters a fault, such as hardware malfunction or states like overcurrent protection, over temperature protection, or over voltage protection, the faulty phase is disabled while the remaining non-faulty phases continue to operate based on their original phase sequence numbers. This results in significant ripple in the output voltage and output current, as well as increased power loss. For example, when the second phase in FIG. 1A fails, the switching node SW1 corresponding to the second phase becomes floating, and the second phase is disabled. As shown in FIG. 1B, since the remaining non-faulty phases continue to operate according to their original phase sequence numbers and timing, with only the second phase being disabled, the output voltage VO and inductor current exhibit significant ripple after the fault occurs.

Compared to the aforementioned prior art, the present invention provides a conversion control circuit for controlling a stackable multiphase power converter. Through a fault indication signal or a fault indication status of the synchronization signal, a fault operation is indicated and controlled, thereby disabling the faulty phase which is taken over by non-faulty phases while reducing the activated phase number. As a result, the stackable multiphase power converter can maintain stable current sharing after a fault occurs, ensuring stable output current and voltage, and reduced power loss.

SUMMARY OF THE INVENTION

From one perspective, the present invention provides a conversion control circuit, configured to control a stackable multiphase power converter, wherein the stackable multiphase power converter includes plural stackable sub-converters, wherein each of the plural stackable sub-converters includes an initial phase sequence number, a power stage circuit, and the conversion control circuit correspondingly, wherein the plurality of the power stage circuits of the plural stackable sub-converters are coupled in parallel with each other, to convert an input power into an output power to a load, wherein the conversion control circuit is configured to operably control at least one switch of the power stage circuit for switching a corresponding inductor to generate the output power, the conversion control circuit comprising: a synchronization terminal, wherein the plurality of the synchronization terminals of the plurality of the conversion control circuits are coupled to each other, such that a synchronization signal is transmitted and received among the plurality of the conversion control circuits through the plurality of the synchronization terminals, wherein the synchronization signal includes plural pulses; and a fault indication signal or a fault indication status indicated by the plural pulses, wherein when at least one of the plural stackable sub-converters experiences a fault, the fault indication signal or the fault indication status of the plural pulses indicates and controls the conversion control circuit to enter a fault operation; wherein during a normal operation, the plural pulses are accumulatively counted as a count value, and when the count value corresponds to the initial phase sequence number of the conversion control circuit, the conversion control circuit enables the power stage circuit; wherein the fault operation includes: the fault indication signal or the fault indication status disables a faulty one of the plural stackable sub-converters, and one of the non-faulty ones among the plural stackable sub-converters takes over the operation of the faulty one.

In one embodiment, the fault operation includes: the conversion control circuit corresponding to the faulty one of the plural stackable sub-converters controls at least one switch of the corresponding power stage circuit to turn off, such that a switching terminal of the corresponding inductor is left floating.

In one embodiment, the fault operation includes: the plurality of conversion control circuits record a fault phase sequence number according to the fault indication signal or the fault indication status, wherein the fault phase sequence number corresponds to the initial phase sequence number of the faulty one of the plural stackable sub-converters.

In one embodiment, the conversion control circuit is configured as a master circuit or a slave circuit; wherein the master circuit is configured to generate the synchronization signal through the synchronization terminal, and the slave circuit is configured to receive the synchronization signal through the synchronization terminal.

In one embodiment, the fault operation includes one of the following: wherein when the master circuit experiences a fault, the conversion control circuit corresponding to one of the non-faulty ones among the plural stackable sub-converters takes over the operation of the master circuit, and the conversion control circuits corresponding to the other non-faulty ones among the plural stackable sub-converters take over the operation according to the fault phase sequence number; or when the slave circuit experiences a fault, the conversion control circuits corresponding to the non-faulty ones among the plural stackable sub-converters take over the operation according to the fault phase sequence number.

In one embodiment, the faulty one among the plural stackable sub-converters is configured to transmit the fault indication signal or the fault indication status; and the non-faulty ones among the plural stackable sub-converters are configured to receive the fault indication signal or the fault indication status and to operate according to the fault indication signal or the fault indication status.

In one embodiment, the fault operation further includes: the fault indication signal or the fault indication status further indicates a reduction in an activated phase number based on a fault phase number; and the non-faulty ones among the plural stackable sub-converters take over the operation of the faulty one of the plural stackable sub-converters according to the corresponding initial phase sequence number and the fault phase sequence number; wherein the fault phase number corresponds to the number of the faulty ones among the plural stackable sub-converters, and the activated phase number increases as a load current consumed by the load increases.

In one embodiment, the conversion control circuit further comprising: a fault indication terminal, wherein the plurality of the fault indication terminals of the plurality of the conversion control circuits are coupled to each other, such that the fault indication signal is transmitted and received among the plurality of the conversion control circuits through the plurality of the fault indication terminals.

In one embodiment, the conversion control circuit is configured as an integrated circuit, the synchronization terminal corresponds to a synchronization pin of the integrated circuit, and the fault indication terminal corresponds to a fault indication pin of the integrated circuit.

In one embodiment, the fault indication status is transmitted and received among the plurality of the conversion control circuits through the plurality of the synchronization terminals, wherein the plural pulses of the synchronization signal include a first predetermined level and a second predetermined level, which are respectively configured to trigger the master circuit and the slave circuit.

In one embodiment, the conversion control circuit further comprising: a driver module, configured to modulate a corresponding pulse of the plural pulses to generate a fault pulse according to a fault detection signal such that the fault pulse includes the fault indication status; wherein the fault detection signal is generated based on an abnormal circuit state of the faulty one of the plural stackable sub-converters; wherein the abnormal circuit state includes an overcurrent protection (OCP) state, an over temperature protection (OTP) state, and an over voltage protection (OVP) state or an under voltage lock out (UVLO) state of the input power or a supply voltage, wherein the supply voltage is configured to provide power to the conversion control circuit.

In one embodiment, the fault indication status includes one of the following: (1) the fault pulse transitions from the first predetermined level or the second predetermined level to a higher level; (2) the fault pulse transitions from the first predetermined level or the second predetermined level to a lower level; (3) a fault pulse width of the fault pulse is greater than a predetermined pulse width; or (4) the fault pulse width of the fault pulse is less than a predetermined pulse width; wherein the higher level is higher than the first predetermined level or the second predetermined level, and the lower level is lower than the first predetermined level or the second predetermined level.

In one embodiment, the driver module at least comprises: a first driver, configured to generate the synchronization signal based on a synchronization input signal; and a second driver, configured to generate a modulation signal based on the fault detection signal, thereby modulating the corresponding pulse; wherein a driving capability of the second driver for generating the modulation signal is higher than a driving capability of the first driver for generating the synchronization signal.

In one embodiment, the conversion control circuit is configured as an integrated circuit, and the synchronization terminal corresponds to a synchronization pin of the integrated circuit.

In one embodiment, during the normal operation, when the count value reaches an activated phase number, a reset signal is generated to reset the count value, wherein the activated phase number increases as a load current consumed by the load increases.

In one embodiment, during the fault operation, when the count value reaches a difference between the activated phase number and a fault phase number, the reset signal is generated, wherein the fault phase number corresponds to the number of the faulty ones among the plural stackable sub-converters.

From another perspective, the present invention provides a control method for controlling a stackable multiphase power converter, wherein the stackable multiphase power converter includes plural stackable sub-converters, wherein each of the plural stackable sub-converters includes an initial phase sequence number and a power stage circuit, wherein the plurality of the power stage circuits of the plural stackable sub-converters are coupled in parallel with each other, wherein the power stage circuit includes at least one switch for switching an inductor to convert an input power into an output power to a load, the control method comprising: controlling the at least one switch of the power stage circuit to switch the corresponding inductor; controlling a synchronization signal to be transmitted and received among the plural stackable sub-converters, wherein the synchronization signal includes plural pulses; when at least one of the plural stackable sub-converters experiences a fault, indicating and controlling the plural stackable sub-converters to enter a fault operation through a fault indication signal or a fault indication status indicated by the plural pulses; and during a normal operation, accumulatively counting the plural pulses as a count value, and enabling the corresponding power stage circuit when the count value corresponds to the initial phase sequence number of one of the plural stackable sub-converters; wherein the fault operation includes: controlling a faulty one of the plural stackable sub-converters to be disabled by the fault indication signal or the fault indication status, and controlling one of the non-faulty ones among the plural stackable sub-converters to take over the operation of the faulty one.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
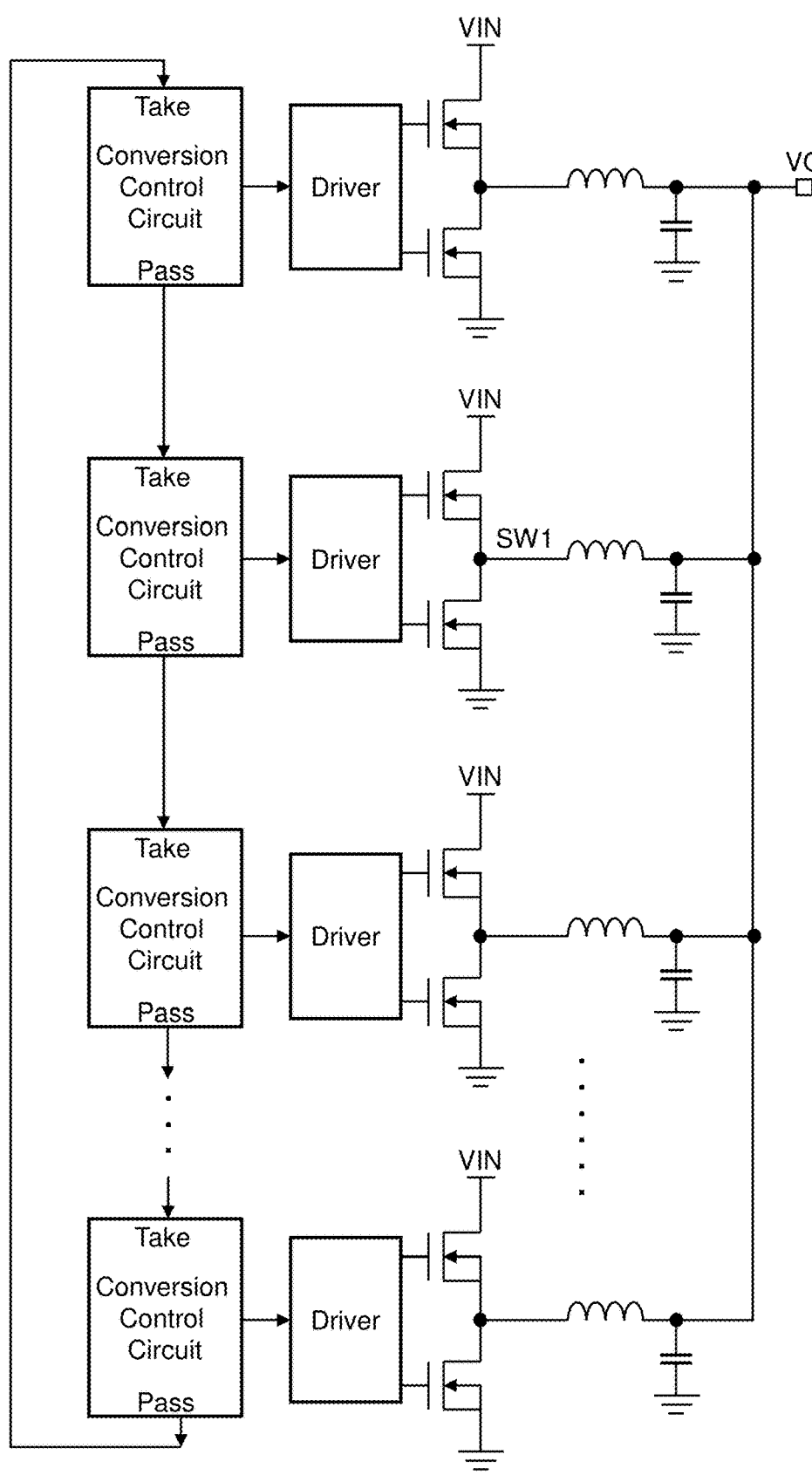
FIG. 1A shows a prior art stackable multiphase power converter.
Figure 1B:
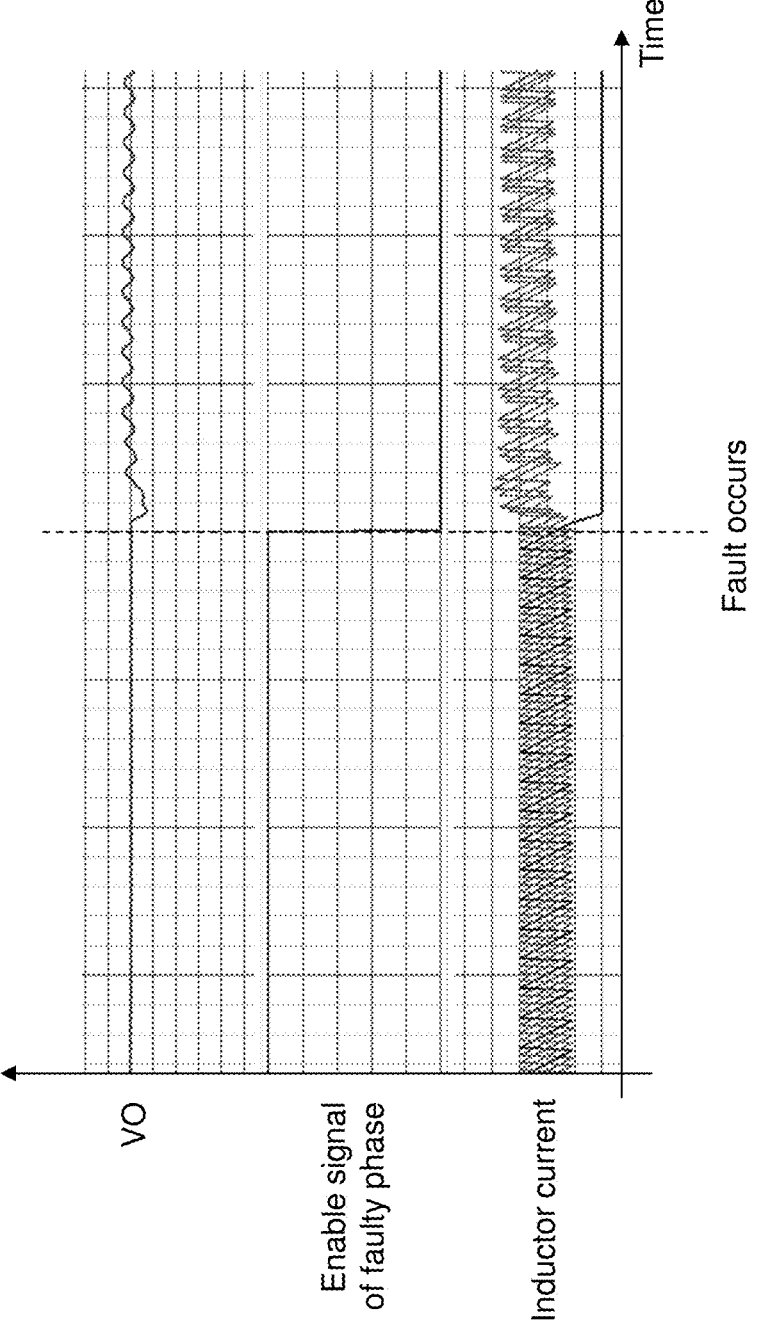
FIG. 1B shows the corresponding operational waveforms of the prior art shown in FIG. 1A.
Figure 2:
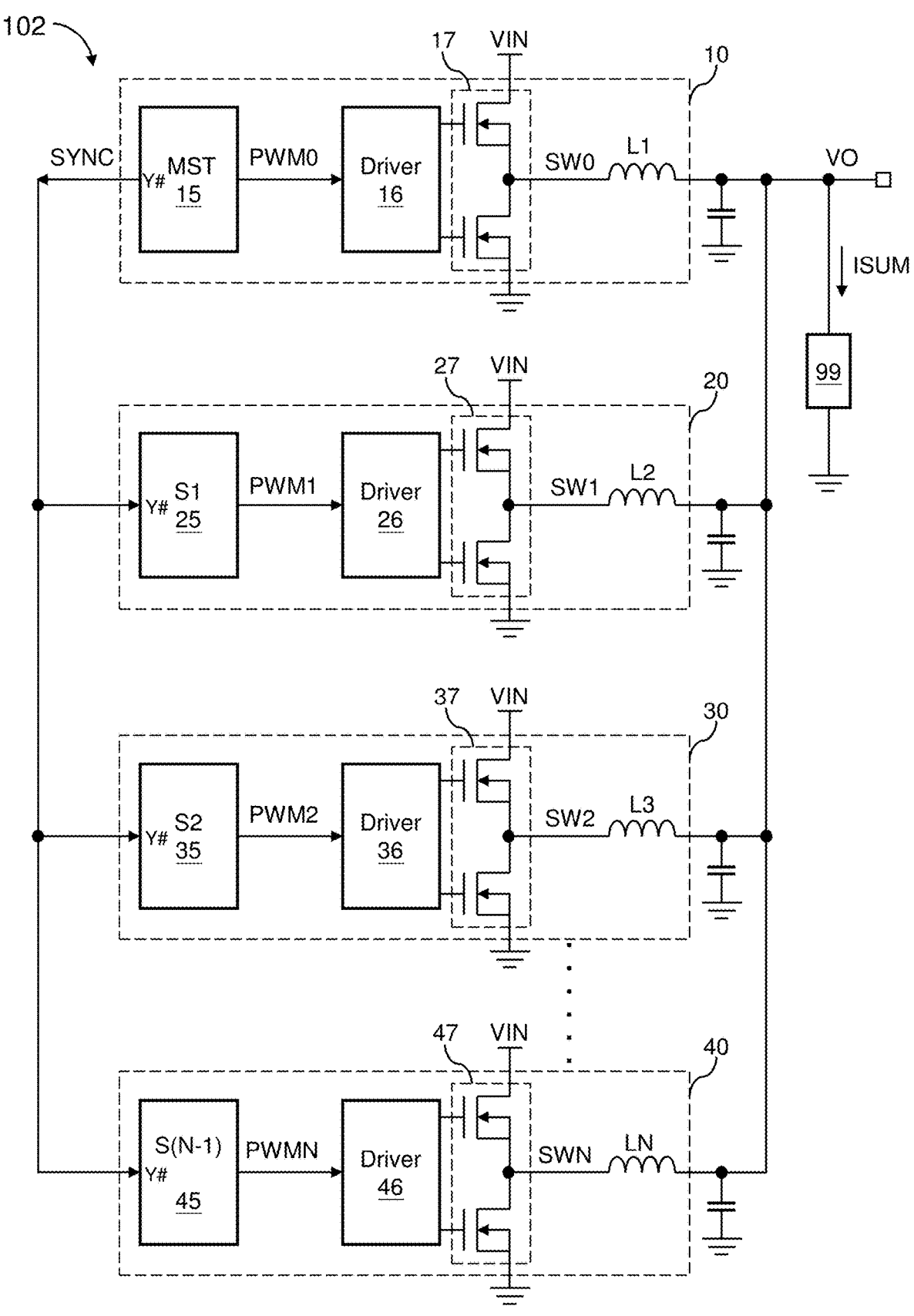
FIG. 2 shows a schematic diagram of one embodiment of the stackable multiphase power converter of the present invention.

FIG. 2 shows a schematic diagram of one embodiment of the stackable multiphase power converter of the present invention. In one embodiment, the stackable multiphase power converter 102 includes plural stackable sub-converters. In this embodiment, the stackable multiphase power converter 102 includes four phases. The plural stackable sub-converters include stackable sub-converters 10, 20, 30, and 40. The circuit operation of the present invention is explained using the stackable multiphase power converter with four phases, and those skilled in the art can deduce the circuit operations of other embodiments with different phase numbers.

In one embodiment, the stackable sub-converters 10, 20, 30, and 40 include a corresponding initial phase sequence number, corresponding power stage circuits 17, 27, 37, and 47, and corresponding conversion control circuits 15, 25, 35, and 45. The power stage circuits 17, 27, 37, and 47 are coupled in parallel to convert an input power (e.g., corresponding to an input voltage VIN) into an output power (e.g., corresponding to an output voltage VO) to supply a load 99. In one embodiment, the power stage circuits 17, 27, 37, and 47 operate in an interleaved manner. Specifically, the power stage circuits 17, 27, 37, and 47 are configured to switch inductors L1, L2, L3, and LN, respectively, to achieve interleaved switching power conversion, where N is an integer greater than 1.

In one embodiment, the power stage circuits are configured as buck converters. However, this does not limit the scope of the present invention. The power stage circuits may also be configured as other types of switching power converters, such as boost converters, buck-boost converters, or flyback converters.

In one embodiment, the conversion control circuits 15, 25, 35, and 45 are configured to control the switching of their respective corresponding power stage circuits 17, 27, 37, and 47. Specifically, the conversion control circuits 15, 25, 35, and 45 control at least one switch of each of the power stage circuits 17, 27, 37, and 47 to switch the corresponding inductors L1, L2, L3, and LN, thereby generating the output power. In one embodiment, the stackable sub-converters 10, 20, 30, and 40 further include corresponding drivers (16, 26, 36, and 46), wherein each of the drivers is coupled between the corresponding conversion control circuit and power stage circuit to drive the switches of the power stage circuit.

In one embodiment, each of the conversion control circuits 15, 25, 35, and 45 can be configured as either a master circuit or a slave circuit, and the interleaved phase sequence numbers are also programmable. For the programming methods of the master or slave circuits and phase sequence numbers, refer to Taiwan Patent No. TWI848793B. In this embodiment, the initial phase sequence numbers of the conversion control circuits 15, 25, 35, and 45 are set to 0, 1, 2, and 3, respectively. In this embodiment, the conversion control circuit 15 with an initial phase sequence number of 0 is set as the master circuit (denoted as MST in FIG. 2), and the conversion control circuits with initial phase sequence numbers other than 0 (e.g., 25, 35, and 45) are set as slave circuits (denoted as S1, S2, and S(N–1) in FIG. 2).

Referring again to FIG. 2 for details, in one embodiment, each of the conversion control circuits 15, 25, 35, and 45 includes a synchronization terminal Y #, as shown in FIG. 2. The plurality of synchronization terminals Y # of the conversion control circuits 15, 25, 35, and 45 are coupled to each other, such that a synchronization signal SYNC is transmitted and received among the conversion control circuits 15, 25, 35, and 45 through the synchronization terminals Y #. The synchronization signal SYNC includes plural pulses. In one embodiment, the conversion control circuits 15, 25, 35, and 45 are configured as integrated circuits, and the synchronization terminal Y # corresponds to a synchronization pin of the integrated circuit. In one embodiment, the plural pulses of the synchronization signal SYNC include a fault indication status. When at least one of the stackable sub-converters 10, 20, 30, and 40 experiences a fault, the fault indication status of the plural pulses is configured to indicate and control the conversion control circuits 15, 25, 35, and 45 to perform a fault operation. In one embodiment, the plural pulses are accumulatively counted as a count value NX. In one embodiment, during normal operation, when the count value NX corresponds to the initial phase sequence number of the conversion control circuit, the conversion control circuit enables the corresponding power stage circuit. In one embodiment, the fault operation includes: the fault indication status of the plural pulses is configured to control a faulty one among the stackable sub-converters 10, 20, 30, and 40 to be disabled, and one of non-faulty ones among the stackable sub-converters 10, 20, 30, and 40 takes over the operation. Specific details are described later.

Figure 3:
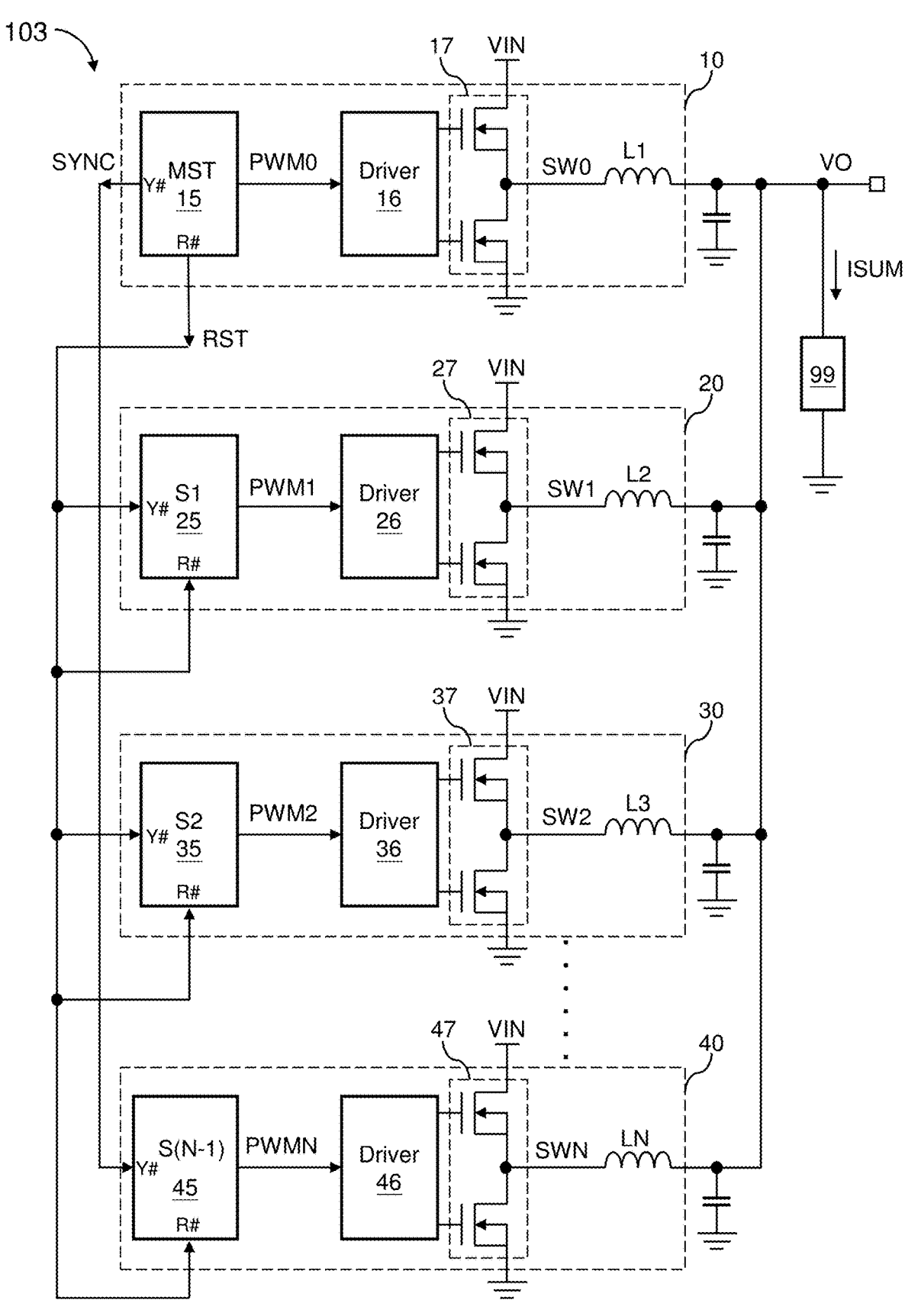
FIG. 3 shows a schematic diagram of another embodiment of the stackable multiphase power converter of the present invention.

FIG. 3 shows a schematic diagram of another embodiment of the stackable multiphase power converter of the present invention. The stackable multiphase power converter 103 shown in FIG. 3 is similar to the stackable multiphase power converter 102 shown in FIG. 2, with the difference being that, in one embodiment, each of the conversion control circuits 15, 25, 35, and 45 in FIG. 3 further includes a reset terminal R #, as shown in FIG. 3. The plurality of reset terminals R # of the conversion control circuits 15, 25, 35, and 45 are coupled to each other, such that a reset signal RST is transmitted and received among the conversion control circuits 15, 25, 35, and 45 through the reset terminals R #. In one embodiment, the master circuit MST generates the reset signal RST through the reset terminal R #, and the slave circuits receive the reset signal RST through the reset terminal R #. For the generation and control methods of the reset signal RST, refer to Taiwan Patent No. TWI848793B.

It should be noted that the operational details of the present invention are described below using the embodiment in FIG. 2 as an example. Those skilled in the art can deduce the operational details of the embodiment in FIG. 3 from the following description.

Figure 4:
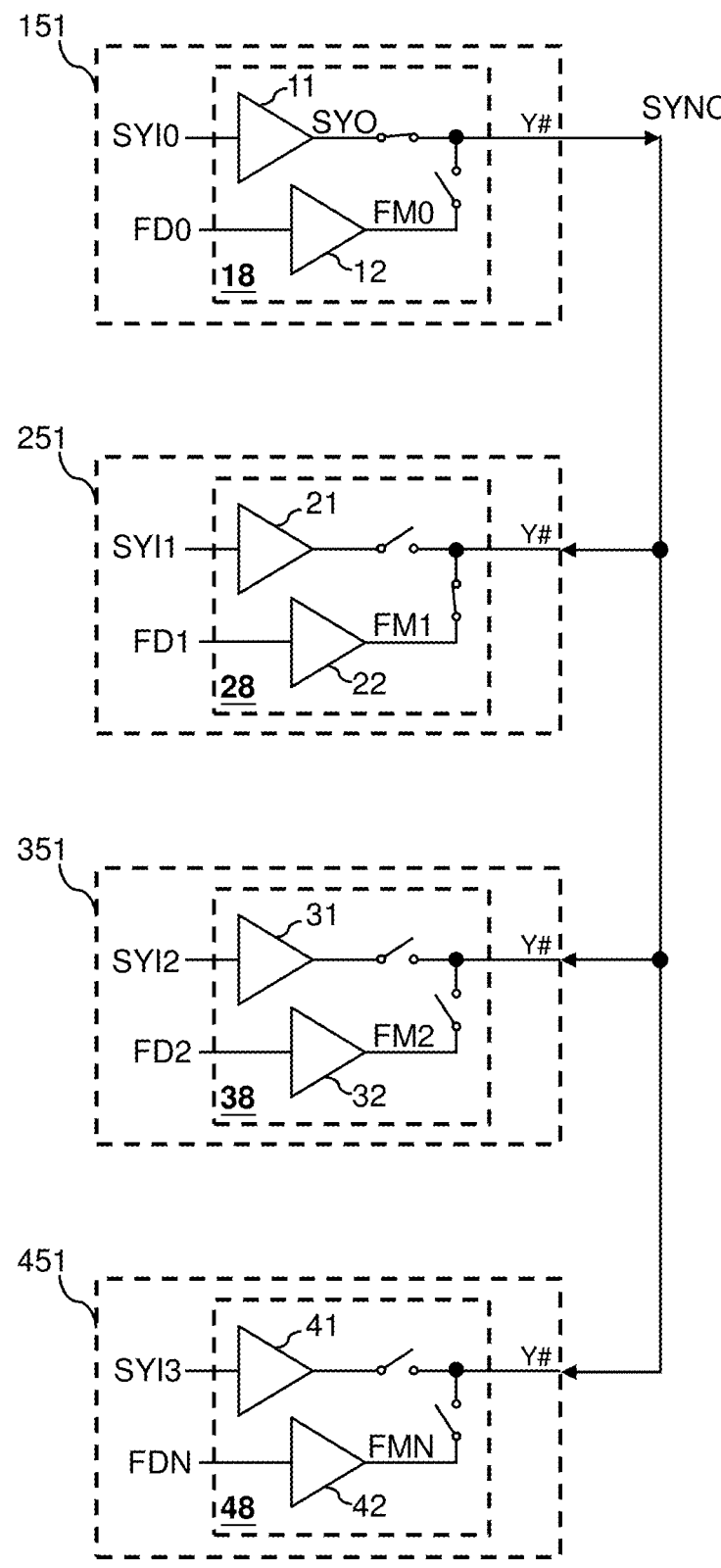
FIG. 4 shows a schematic diagram of a portion of the conversion control circuit of the stackable multiphase power converter of the present invention.

FIG. 4 shows a schematic diagram of a portion of the conversion control circuit of the stackable multiphase power converter of the present invention. The conversion control circuits 151, 251, 351, and 451 shown in FIG. 4 are a portion of specific embodiments of the conversion control circuits 15, 25, 35, and 45 shown in FIG. 2. In one embodiment, the conversion control circuits 151, 251, 351, and 451 further include corresponding driver modules 18, 28, 38, and 48. Each of the driver modules 18, 28, 38, and 48 is configured to detect a fault detection signal FD0, FD1, FD2, or FDN of the respective conversion control circuit and to modulate a corresponding pulse of the plural pulses in the synchronization signal SYNC based on the respective fault detection signal FD0, FD1, FD2, or FDN, thereby generating a fault pulse such that the fault pulse includes a fault indication status.

In one embodiment, the driver modules 18, 28, 38, and 48 include corresponding first drivers 11, 21, 31, and 41, corresponding second drivers 12, 22, 32, and 42, and a plurality of switches. In one embodiment, the plurality of switches include switches coupled to the output terminal of each first driver and switches coupled to the output terminal of each second driver. In one embodiment, the first drivers 11, 21, 31, and 41 are configured to generate the synchronization signal SYNC based on corresponding synchronization input signals SYI0, SYI1, SYI2, and SYIN when configured as the master circuit. In one embodiment, the second drivers 12, 22, 32, and 42 are configured to generate corresponding modulation signals FM0, FM1, FM2, and FMN based on corresponding fault detection signals FD0, FD1, FD2, and FDN, thereby modulating the corresponding pulses of the plural pulses of the synchronization signal SYNC. In one embodiment, a driving capability of the second drivers 12, 22, 32, and 42 for generating the modulation signals FM0, FM1, FM2, and FMN is higher than a driving capability of the first drivers 11, 21, 31, and 41 for generating the synchronization signal SYNC. For example, the second drivers 12, 22, 32, and 42 have lower output impedance compared to the first drivers 11, 21, 31, and 41. Specific details of FIG. 4 are described later.

It should be noted that the fault detection signals FD0, FD1, FD2, and FDN are generated based on the abnormal circuit states of the corresponding conversion control circuits 151, 251, 351, and 451. Furthermore, it should be noted that the abnormal circuit states include an overcurrent protection (OCP) state, an over temperature protection (OTP) state, and an over voltage protection (OVP) state or an under voltage lock out (UVLO) state of the input power or supply voltage, wherein the supply voltage is configured to provide power to the conversion control circuit.

Figure 5A:
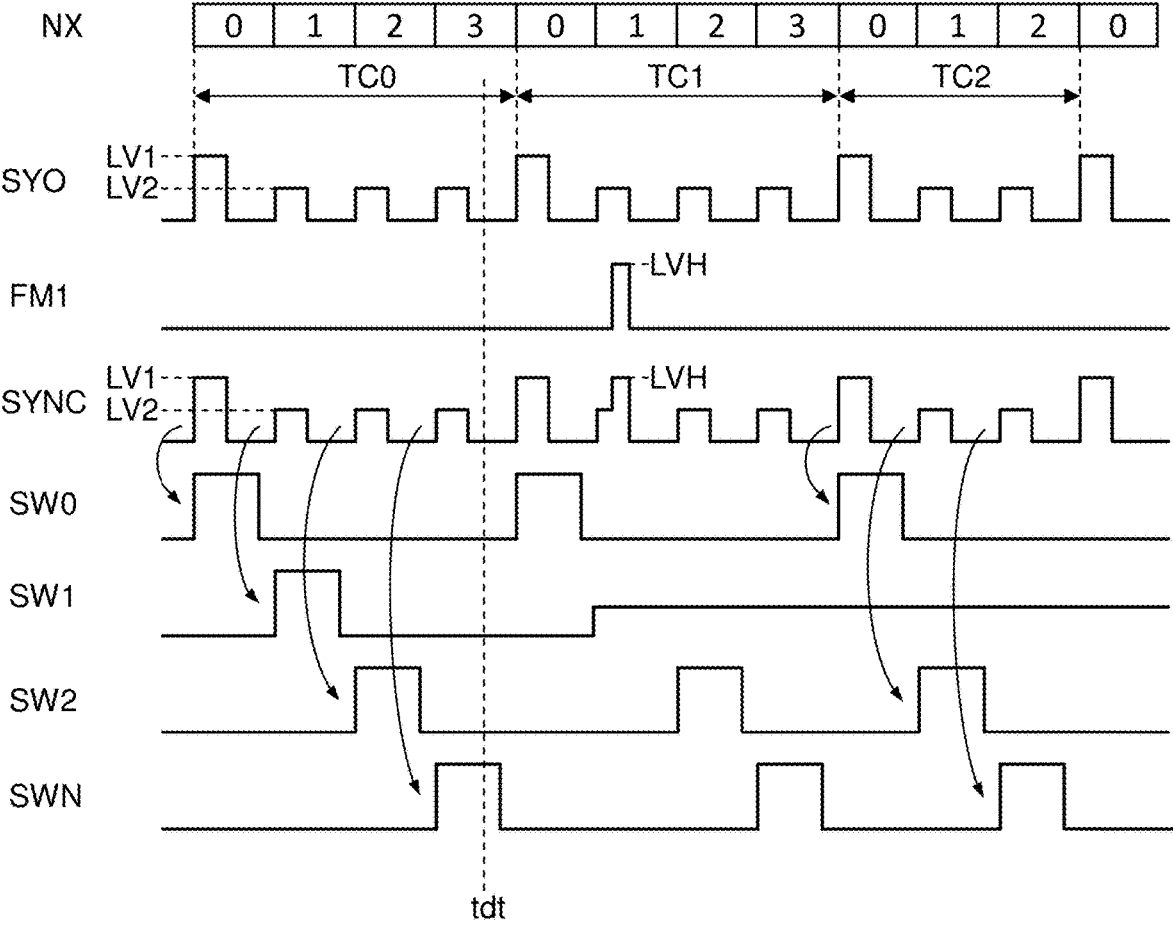
FIG. 5A to FIG. 5D show operational waveforms of several embodiments of the present invention corresponding to FIG. 2.

FIGS. 5A to 5D show operational waveforms of several embodiments of the present invention corresponding to FIG. 2. Referring to FIGS. 2, 4, and 5A simultaneously, in a specific embodiment, the switch coupled to the first driver 11 of the master circuit (i.e., the conversion control circuit 151, hereinafter the same) is turned on to generate and transmit the synchronization signal SYNC based on the synchronization input signal SYI0. The switches coupled to the first drivers (21, 31, and 41) of the slave circuits (i.e., the conversion control circuits 251, 351, and 451, hereinafter the same) are all turned off, allowing them to receive the synchronization signal SYNC through the synchronization terminals Y #. In one embodiment, as shown in FIG. 5A, the plural pulses of the synchronization signal SYNC include a first predetermined level LV1 and a second predetermined level LV2. In this embodiment, the pulses with the first predetermined level LV1 in the synchronization signal SYNC can be used as reset pulses to control the slave circuits to reset the aforementioned count value NX. On the other hand, the pulses with the first predetermined level LV1 and the second predetermined level LV2 in the synchronization signal SYNC are configured to trigger the master circuit and the slave circuits, respectively, to perform counting and operation. As shown in FIG. 5A, the voltage of the switching node SW0 of the master circuit is turned on for a constant on-time when triggered by the first predetermined level LV1 of the synchronization signal SYNC. The voltages of the switching nodes SW1, SW2, and SWN of the slave circuits are turned on for a constant on-time when triggered by the second predetermined level LV2 of the synchronization signal SYNC and when the count value NX corresponds to the initial phase sequence number of the conversion control circuit. Furthermore, in one embodiment, the synchronization input signal SYI0 may include a plurality of internal sub-signals, such as an internal reset signal, an internal synchronization signal, etc. For details on controlling the plural pulses in the synchronization signal SYNC to include the first predetermined level LV1 and the second predetermined level LV2, refer to Taiwan Patent No. TWI848793B.

Referring again to FIGS. 2, 4, and 5A, in this embodiment, the conversion control circuit 151 is configured as the master circuit, and the conversion control circuits 251, 351, and 451 are configured as slave circuits. During the normal operation (e.g., in a period TC0), the plural pulses of the synchronization signal SYNC are determined by the driving signal SYO generated by the first driver 11 of the conversion control circuit 151. As an exemplary embodiment, as shown in FIG. 5A, during the period TC0 of the synchronization signal SYNC, the driver module 28 detects a fault detection signal FD1 at time tdt. In the next period of the synchronization signal SYNC (i.e., a period TC1), the modulation signal FM1 generated by the second driver 22 generates a corresponding modulation pulse, and the switch coupled to the second driver 22 is turned on, thereby modulating the corresponding pulse (the second pulse in the period TC1) of the plural pulses in the synchronization signal SYNC to generate a fault pulse (i.e., the second pulse in the period TC1, hereinafter the same), such that the fault pulse includes the fault indication status. Specifically, in this embodiment, the modulation pulse of the modulation signal FM1 features a higher level LVH, a narrower pulse width, and a later trigger. Furthermore, as mentioned earlier, the output impedance of the second driver 22 is lower. Thus, in the period TC1, the level of the first half of the second pulse of the synchronization signal SYNC is determined by the driving signal SYO of the first driver 11, while the second half of the second pulse is determined by the modulation signal FM1 generated by the second driver 22, overriding the driving signal SYO. As a result, the fault pulse includes a fault indication status: transitioning from the second predetermined level LV2 to the higher level LVH.

Referring again to FIGS. 2, 4, and 5A. In one embodiment, the faulty one among the stackable sub-converters 10, 20, 30, and 40 (e.g., the stackable sub-converter 20) configured to transmit the fault indication status through the synchronization terminal Y #, and the non-faulty ones among the stackable sub-converters 10, 20, 30, and 40 (e.g., the stackable sub-converters 10, 30, and 40) receive the fault indication status and operate accordingly. In a specific embodiment, the fault operation includes: the conversion control circuit 251 corresponding to the faulty stackable sub-converter 20 controls at least one switch of the corresponding power stage circuit 27 to turn off, such that the switching terminal (switching node SW1) of the corresponding inductor L2 is left floating. As shown in FIG. 5A, after the period TC1, the voltage of the switching node SW1 equals the output voltage VO. In other words, due to the fault, the stackable sub-converter 20 no longer participates in the multiphase power conversion during subsequent switching periods. On the other hand, in a specific embodiment, the fault operation further includes: the conversion control circuits 151, 251, 351, and 451 record the fault phase sequence number based on the fault indication status. In this embodiment, the fault phase sequence number corresponds to the initial phase sequence number (i.e., 1) of the faulty stackable sub-converter 20.

In one embodiment, the fault operation further includes: the conversion control circuits of the non-faulty stackable sub-converters 10, 30, and 40 (e.g., the conversion control circuit 251) take over the operations based on the fault phase sequence number (e.g., 1).

As shown in FIG. 5A, in this embodiment, the conversion control circuits further update the activated phase number based on the fault phase number according to the fault indication status. The activated phase number refers to the number of phases among the plural stackable sub-converters that are activated during one period (e.g., TC0) of the synchronization signal SYNC. In one embodiment, the activated phase number increases or decreases based on the load current consumed by the load 99. Under low load conditions, some phases of the stackable sub-converters can be temporarily disabled and are not required to participate in power conversion. The fault phase number corresponds to the total number of faulty stackable sub-converters. In this embodiment, the initial activated phase number is 4, and the fault phase number is 1. Therefore, after the period TC1, the activated phase number is updated to 3, which is the difference between the activated phase number before the fault and the fault phase number.

On the other hand, in one embodiment, during a period TC2, the non-faulty stackable sub-converters 10, 30, and 40 take over the operation of the faulty stackable sub-converter 20 based on the corresponding initial phase sequence numbers 0, 2, and 3 and the fault phase sequence number 1. Specifically, the initial phase sequence number 0 of the stackable sub-converter 10 is less than the fault phase sequence number 1. Therefore, the corresponding conversion control circuit 151 remains enabled for the corresponding power stage circuit 17 when the count value NX equals 0. The initial phase sequence numbers 2 and 3 of the stackable sub-converters 30 and 40 are greater than the fault phase sequence number 1. Therefore, the corresponding conversion control circuits 351 and 451 take over based on the fault phase sequence number 1, becoming enabled for the corresponding power stage circuits 37 and 47 when the count value NX equals 1 and 2, respectively.

Referring back to FIG. 3, it should be noted that in the embodiment of FIG. 3, the count value NX is reset by the reset signal RST. In this embodiment, as there is no need to trigger the reset using the synchronization signal SYNC, during the normal operation, the levels of the plural pulses of the synchronization signal SYNC are identical. When fault occurs on a phase, the corresponding pulse of the synchronization signal SYNC can form a fault pulse as described earlier. In the embodiment of FIG. 3, during the normal operation, when the count value NX reaches the activated phase number, the reset signal RST is generated by the master to reset the count value NX. During the fault operation, when the count value NX reaches the difference between the activated phase number and the fault phase number, the reset signal RST is generated. For other details of fault operation in FIG. 3, those skilled in the art can deduce from the above description and Taiwan Patent No. TWI848793B.

Figure 5B:
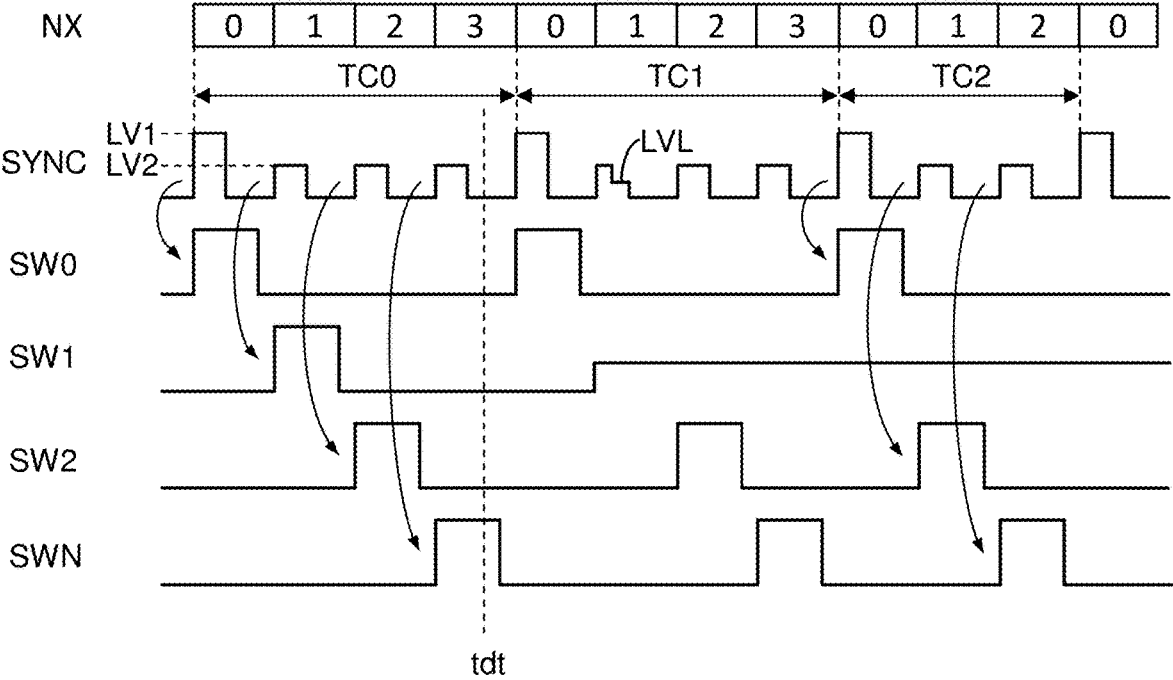

Referring to FIG. 5B, the embodiment in FIG. 5B is similar to the embodiment in FIG. 5A. In one embodiment, the modulation pulse of the modulation signal FM1 has a lower level LVL, such that the fault indication status of the fault pulse includes a transition from the second predetermined level LV2 to the lower level LVL. Other details of FIG. 5B can be deduced from the description of FIG. 5A.

Figure 5C:
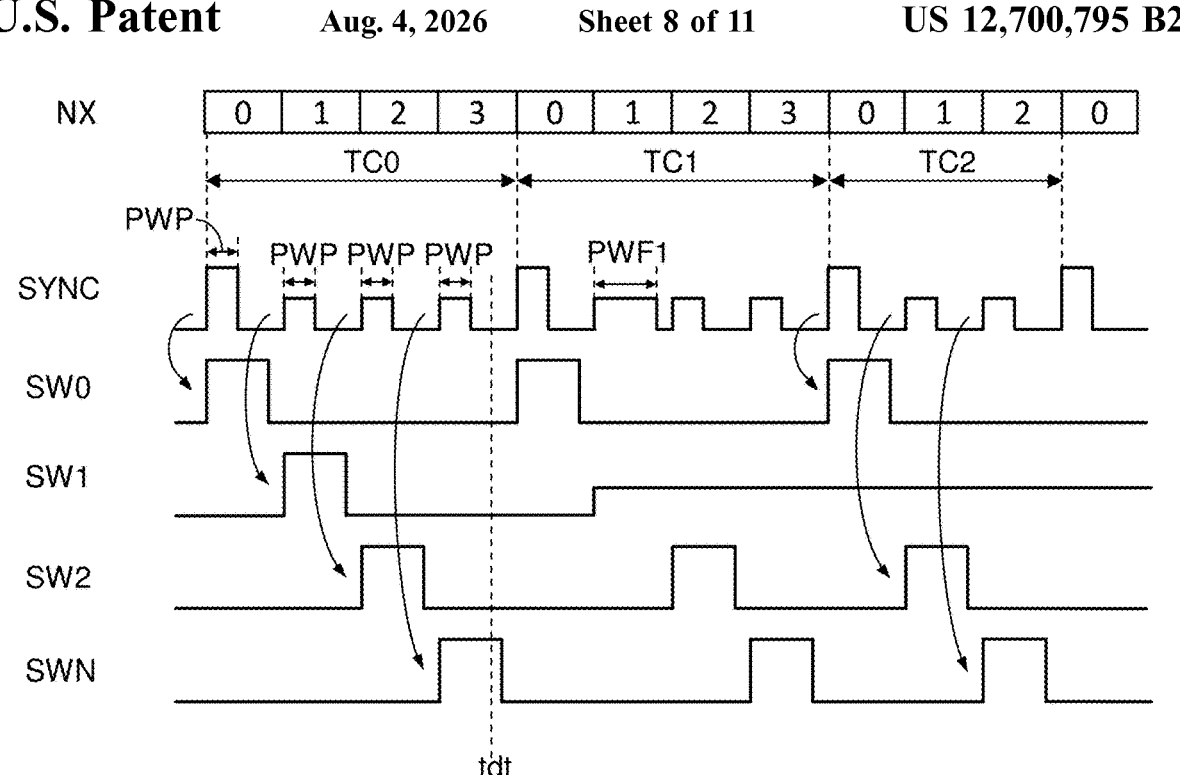
Figure 5D:
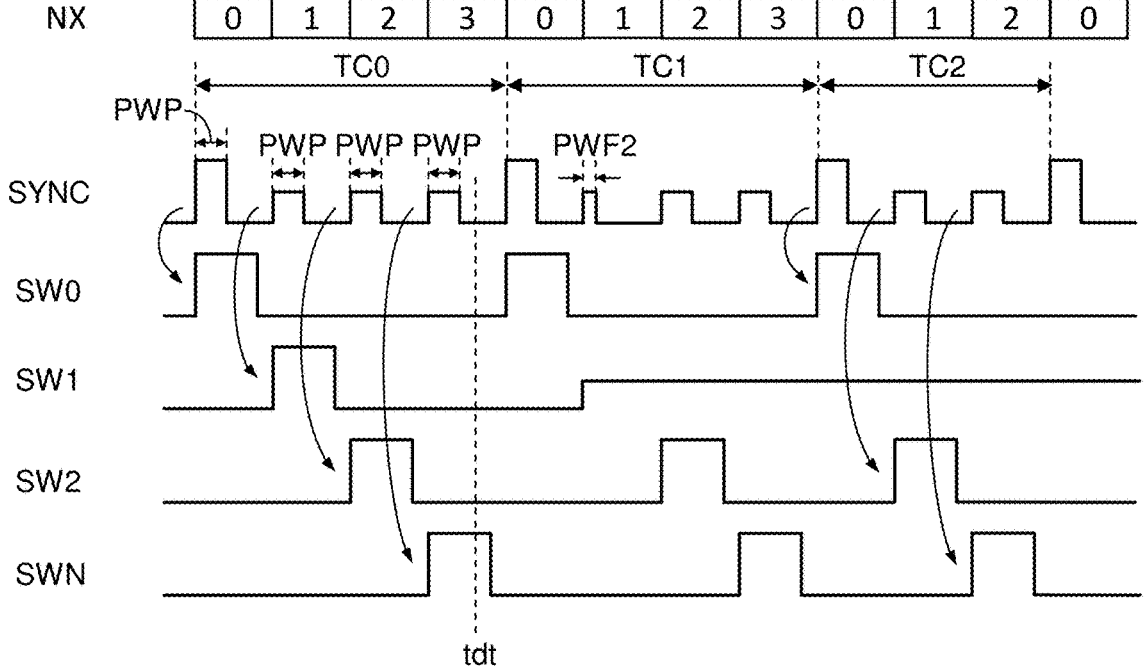

Referring to FIGS. 5C and 5D, in one embodiment, as shown in FIG. 5C, during the period TC0, the plural pulses of the synchronization signal SYNC have a predetermined pulse width PWP. After the fault detection signal FD1 is detected at time tdt, during the period TC1, the fault indication status of the fault pulse includes a fault pulse width PWF1 that is greater than the predetermined pulse width PWP. In another embodiment, as shown in FIG. 5D, during the period TC1, the fault indication status of the fault pulse includes a fault pulse width PWF2 that is smaller than the predetermined pulse width PWP. Other details of FIGS. 5C and 5D can be deduced from the description of FIG. 5A.

Figure 6:
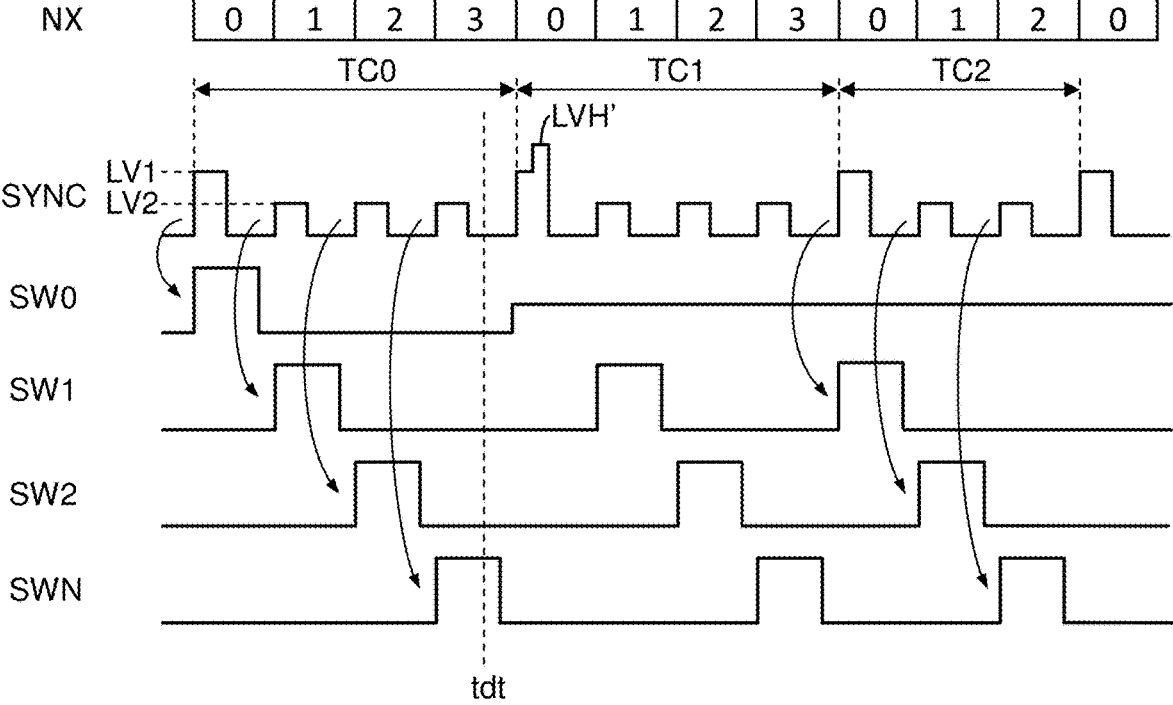
FIG. 6 shows operational waveforms of another embodiment of the present invention corresponding to FIG. 2.

Referring simultaneously to FIGS. 2 and 6, FIG. 6 shows operational waveforms of another embodiment of the present invention corresponding to FIG. 2. In the embodiment of FIG. 6, the fault pulse corresponding to the faulty stackable sub-converter 10, which is the master circuit MST, includes a fault indication status: a transition from the first predetermined level LV1 to a higher level LVH'. In one embodiment, the fault operation includes: when the master circuit MST encounters a fault, one conversion control circuit of the non-faulty stackable sub-converters 10, 20, 30, and 40 takes over the operation of the master circuit MST, while other conversion control circuits of the other non-faulty stackable sub-converters take over operations based on the fault phase sequence number. In a specific embodiment, when the stackable sub-converter 10 (initial master circuit MST) encounters a fault, the conversion control circuit 25 of the non-faulty stackable sub-converter 20 takes over the role of the master circuit MST, meaning that the conversion control circuit 25 enables the corresponding power stage circuit 27 when the count value NX is 0. On the other hand, the conversion control circuits 35 and 45 of the non-faulty stackable sub-converters 30 and 40 take over operations based on the fault phase sequence number 0 and the synchronization signal SYNC. The synchronization signal SYNC is generated by the conversion control circuit 25 that takes over the role of the master circuit MST. Specifically, the conversion control circuits 35 and 45 enable the corresponding power stage circuits 37 and 47 when the count value NX is 1 and 2, respectively. Other details of FIG. 6 can be deduced from the descriptions of FIGS. 2, 4, and 5A.

It should be noted that FIG. 6 shows only one embodiment where the fault indication status of the master circuit MST encountering a fault is shown. In other embodiments, the fault indication statuses in FIGS. 5B to 5D can also be configured to indicate and control scenarios where the master circuit MST encounters a fault. Refer to the descriptions of FIGS. 5B to 5D.

Figure 7:
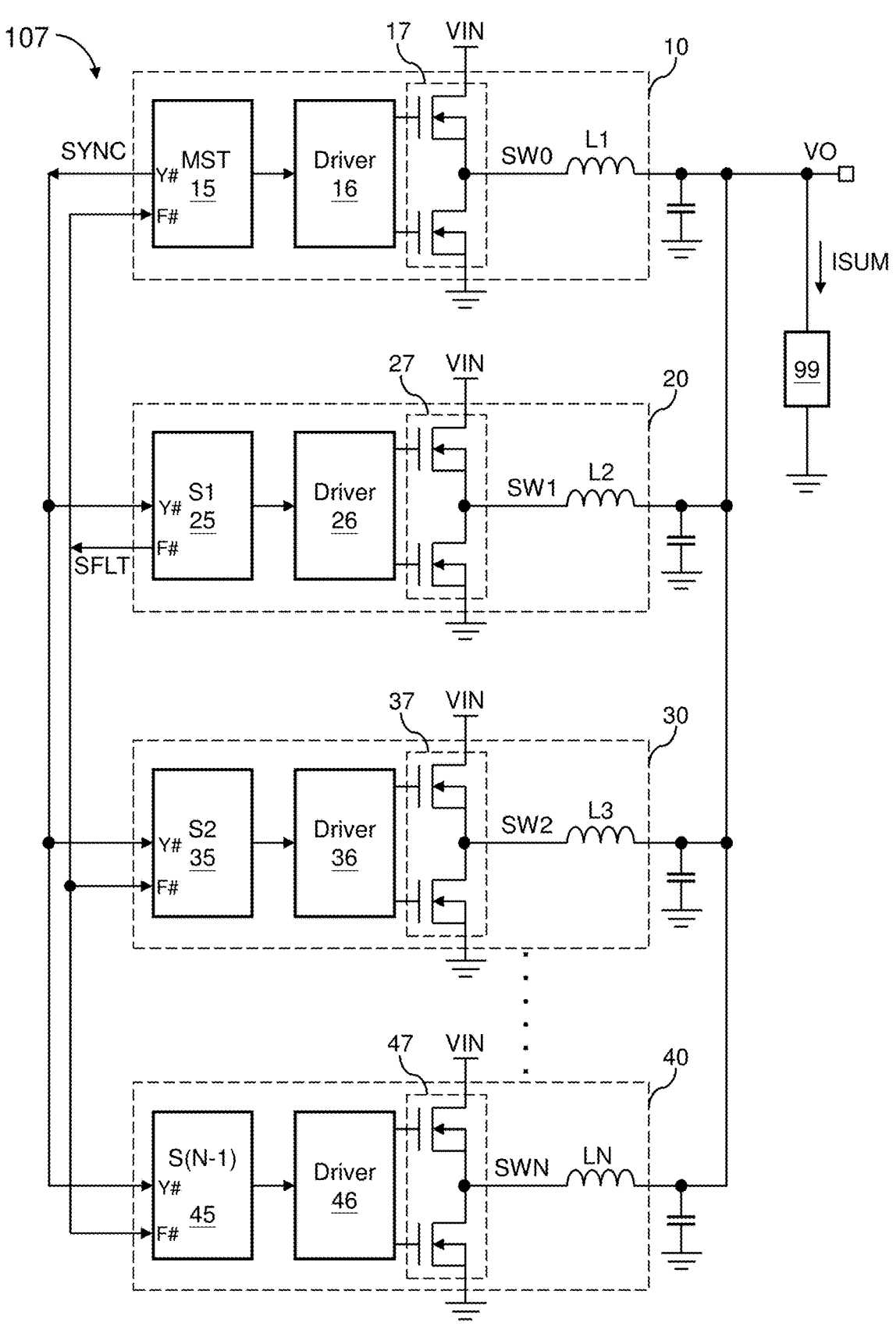
FIG. 7 shows a schematic diagram of another embodiment of the stackable multiphase power converter of the present invention.

FIG. 7 shows a schematic diagram of another embodiment of the stackable multiphase power converter of the present invention. The stackable multiphase power converter 107 shown in FIG. 7 is similar to the stackable multiphase power converter 102 shown in FIG. 2, with the difference being that, in one embodiment, each of the conversion control circuits 15, 25, 35, and 45 in FIG. 7 further includes a fault indication terminal F #. The plurality of fault indication terminals F # of the conversion control circuits 15, 25, 35, and 45 are coupled to each other, such that a fault indication signal SFLT is transmitted and received among the conversion control circuits 15, 25, 35, and 45 through the fault indication terminals F #. In one embodiment, the conversion control circuits 15, 25, 35, and 45 are configured as integrated circuits, and the fault indication terminal F # corresponds to a fault indication pin of each of the integrated circuit.

Figure 8:
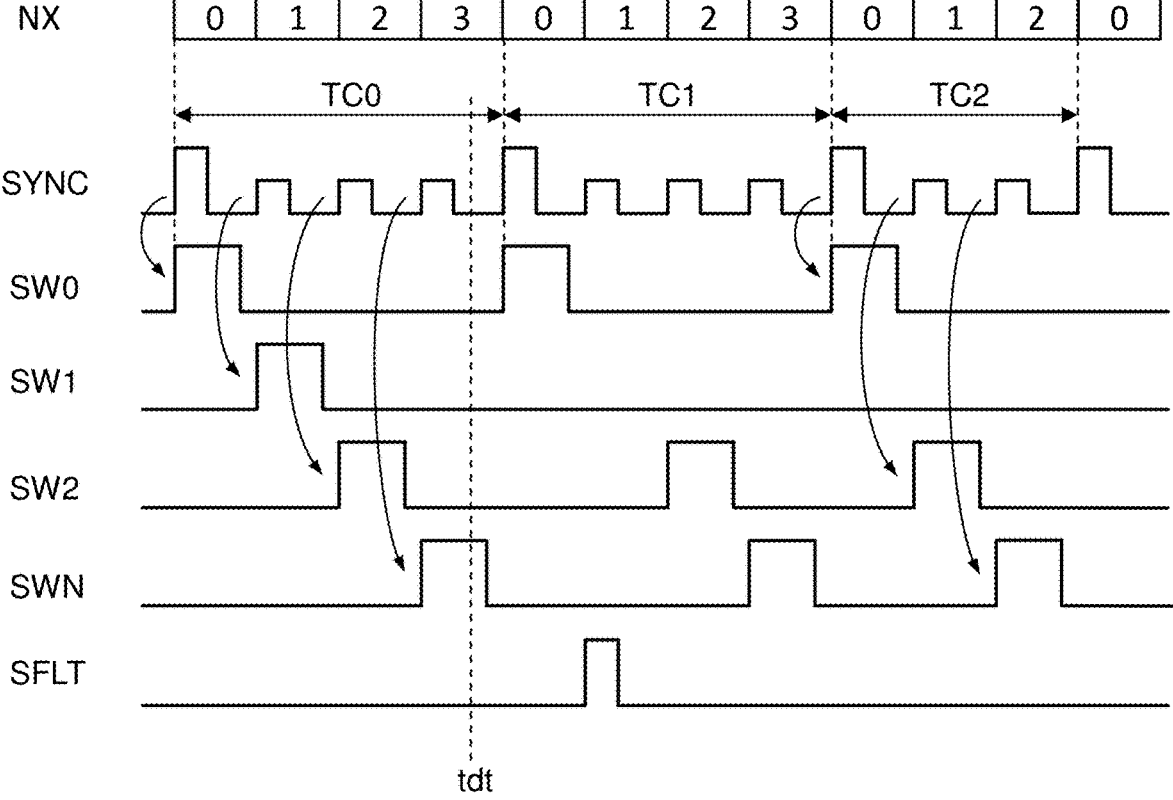
FIG. 8 shows operational waveforms of one embodiment of the present invention corresponding to FIG. 7.

Referring simultaneously to FIGS. 7 and 8, FIG. 8 shows operational waveforms of one embodiment of the present invention corresponding to FIG. 7. In one embodiment, when at least one of the stackable sub-converters 10, 20, 30, and 40 encounters a fault, the fault indication signal SFLT is configured to indicate and control the conversion control circuits 15, 25, 35, and 45 to enter a fault operation. In a specific embodiment, as shown in FIG. 8, the stackable sub-converter 20 detects a fault at time tdt. During the next period TC1 of the synchronization signal SYNC, the stackable sub-converter 20 drives the fault indication signal SFLT to generate a pulse when the count value NX is 1 based on the synchronization signal SYNC. The pulse indicates and controls the conversion control circuits 15, 25, 35, and 45 to enter the fault operation.

It should be noted that in the embodiments shown in FIGS. 2, 4, 5A to 5D, and 6, fault operations are indicated and controlled by the fault indication statuses of the plural pulses of the synchronization signal SYNC. In the embodiments shown in FIGS. 7 and 8, fault operations are indicated and controlled by the fault indication signal SFLT. Specific operational details of fault operations in FIGS. 7 and 8, such as disabling the faulty stackable sub-converters and controlling non-faulty stackable sub-converters to take over operations, are identical to those in the previously described embodiments. Thus, those skilled in the art can deduce from the above descriptions.

Furthermore, it should be noted that the present invention disables the faulty stackable sub-converters and controls other non-faulty stackable sub-converters to take over operations. The activated phase number is reduced based on the fault phase number. Thus, even when a fault occurs and the faulty phases are disabled, non-faulty phases can take over operations while the activated phase number is reduced. This allows the stackable multiphase power converter to maintain stable current sharing, achieving stable output current and voltage while reducing power loss.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A stackable multiphase power converter, comprising a plurality of stackable sub-converters, wherein each of the plurality of stackable sub-converters includes a respective initial phase sequence number, a respective power stage circuit, and a respective conversion control circuit;

wherein the plurality of power stage circuits are coupled in parallel, to convert an input power into an output power to a load;

wherein one of the plurality of conversion control circuits, when configured as a master circuit, is configured to generate a synchronization signal, and each of other ones of the plurality of conversion control circuits, when configured as a slave circuit, is configured to receive the synchronization signal, wherein the synchronization signal includes a plurality of pulses;

wherein each of the plurality of conversion control circuits is configured to operably control at least one switch of a corresponding power stage circuit for switching an inductor thereof to generate the output power;

wherein each of the plurality of conversion control circuits comprises:

a synchronization terminal, wherein the synchronization terminals of the plurality of conversion control circuits are coupled to each other, such that the synchronization signal is transmitted and received among the plurality of the conversion control circuits;

wherein during a normal operation, the plurality of pulses are accumulatively counted as a count value, and when the count value corresponds to a respective initial phase sequence number of a corresponding one of the plurality of conversion control circuits, the corresponding conversion control circuit enables a corresponding power stage circuit;

wherein when at least one of the plurality of stackable sub-converters experiences a fault, a fault indication signal or a fault indication status indicates and controls the corresponding conversion control circuit to enter a fault operation, wherein the plurality of pulses of the synchronization signal include the fault indication status;

wherein during the fault operation, the fault indication signal or the fault indication status disables a faulty one of the plurality of stackable sub-converters; and the plurality of conversion control circuits record a fault phase sequence number according to the fault indication signal or the fault indication status, wherein the fault phase sequence number corresponds to a respective initial phase sequence number of the faulty one of the plurality of stackable sub-converters;

wherein the fault operation further includes one of the following:

when the master circuit experiences the fault, a conversion control circuit of a non-faulty one of the plurality of stackable sub-converters takes over operation of the master circuit, and conversion control circuits of other non-faulty ones among the plurality of stackable sub-converters take over operation according to the fault phase sequence number; or when a slave circuit experiences the fault, conversion control circuits of non-faulty ones among the plurality of stackable sub-converters take over operation according to the fault phase sequence number;

wherein a conversion control circuit of the faulty one of the plurality of stackable sub-converters is configured to transmit the fault indication signal or the fault indication status; and wherein conversion control circuits of non-faulty ones among the plurality of stackable sub-converters are configured to receive the fault indication signal or the fault indication status and to operate according to the fault indication signal or the fault indication status.

2. The stackable multiphase power converter of claim 1, wherein the fault operation includes: controlling, by a conversion control circuit of the faulty one of the plurality of stackable sub-converters, at least one switch of a power stage circuit of the faulty one to turn off, such that a switching terminal of an inductor of the faulty one is left floating.

3. The stackable multiphase power converter of claim 1, wherein the fault operation further includes:

the fault indication signal or the fault indication status further indicating a reduction in an activated phase number based on a fault phase number; and conversion control circuits of non-faulty ones among the plurality of stackable sub-converters taking over operation of the faulty one of the plurality of stackable sub-converters according to respective initial phase sequence numbers and the fault phase sequence number;

wherein the fault phase number corresponds to a number of faulty ones among the plurality of stackable sub-converters, and the activated phase number increases as a load current consumed by the load increases.

4. The stackable multiphase power converter of claim 1, wherein each of the plurality of conversion control circuits further comprising a fault indication terminal, wherein the fault indication terminals of the plurality of conversion control circuits are coupled to each other, such that the fault indication signal is transmitted and received among the plurality of conversion control circuits through the fault indication terminals.

5. The stackable multiphase power converter of claim 4, wherein each of the plurality of conversion control circuits is configured as an integrated circuit, and wherein, for each of the plurality of conversion control circuits, the synchronization terminal corresponds to a synchronization pin of the integrated circuit, and the fault indication terminal corresponds to a fault indication pin of the integrated circuit.

6. The stackable multiphase power converter of claim 1, wherein the fault indication status is transmitted and received among the plurality of conversion control circuits through the synchronization terminals of the plurality of conversion control circuits, wherein the plurality of pulses of the synchronization signal include a first predetermined level and a second predetermined level, the first predetermined level being configured to trigger the master circuit and the second predetermined level being configured to trigger the slave circuit.

7. The stackable multiphase power converter of claim 6, wherein each of the plurality of conversion control circuits further comprises a driver module configured to modulate one of the plurality of pulses to generate a fault pulse according to a fault detection signal such that the fault pulse includes the fault indication status;

wherein the fault detection signal is generated based on an abnormal circuit state of the faulty one of the plurality of stackable sub-converters;

wherein the abnormal circuit state includes an overcurrent protection (OCP) state, an over temperature protection (OTP) state, and at least one of an over voltage protection (OVP) state and an under voltage lock out (UVLO) state of the input power or a supply voltage, wherein the supply voltage is configured to provide power to the plurality of conversion control circuits.

8. The stackable multiphase power converter of claim 7, wherein the fault indication status includes one of the following:

(1) the fault pulse transitions from the first predetermined level or the second predetermined level to a higher level;

(2) the fault pulse transitions from the first predetermined level or the second predetermined level to a lower level;

(3) a fault pulse width of the fault pulse is greater than a predetermined pulse width; or (4) the fault pulse width of the fault pulse is less than a predetermined pulse width;

wherein the higher level is higher than both the first predetermined level and the second predetermined level, and the lower level is lower than both the first predetermined level and the second predetermined level.

9. The stackable multiphase power converter of claim 7, wherein the driver module in each of the plurality of conversion control circuits comprises:

a first driver configured to generate the synchronization signal based on a synchronization input signal; and a second driver configured to generate a modulation signal based on the fault detection signal to modulate one of the plurality of pulses;

wherein a driving capability of the second driver is higher than a driving capability of the first driver.

10. The stackable multiphase power converter of claim 7, wherein each of the plurality of conversion control circuits is configured as an integrated circuit, and wherein the synchronization terminal of each of the plurality of conversion control circuits corresponds to a synchronization pin of the integrated circuit.

11. The stackable multiphase power converter of claim 1, wherein during the normal operation, when the count value corresponds to an activated phase number, a reset signal is generated to reset the count value, wherein the activated phase number increases as a load current consumed by the load increases.

12. The stackable multiphase power converter of claim 11, wherein during the fault operation, when the count value corresponds to a value obtained by subtracting a fault phase number from the activated phase number, the reset signal is generated, wherein the fault phase number corresponds to a number of faulty ones among the plurality of stackable sub-converters.

13. A control method for controlling a stackable multiphase power converter, wherein the stackable multiphase power converter includes a plurality of stackable sub-converters, wherein each of the plurality of stackable sub-converters includes a respective initial phase sequence number, a respective power stage circuit, and a respective conversion control circuit, wherein the plurality of power stage circuits are coupled in parallel to convert an input power into an output power to a load, the control method comprising:

generating, by one of the plurality of conversion control circuits when configured as a master circuit, a synchronization signal, wherein the synchronization signal includes a plurality of pulses;

receiving, by each of other ones of the plurality of conversion control circuits when configured as a slave circuit, the synchronization signal;

controlling, by each of the plurality of conversion control circuits, at least one switch of a corresponding power stage circuit to switch an inductor thereof to generate the output power;

transmitting and receiving the synchronization signal among the plurality of conversion control circuits through synchronization terminals of the plurality of conversion control circuits;

during a normal operation, accumulatively counting the plurality of pulses as a count value, and enabling a corresponding power stage circuit when the count value corresponds to a respective initial phase sequence number of a corresponding one of the plurality of conversion control circuits;

when at least one of the plurality of stackable sub-converters experiences a fault, indicating and controlling a corresponding conversion control circuit to enter a fault operation through a fault indication signal or a fault indication status, wherein the plurality of pulses of the synchronization signal include the fault indication status;

wherein during the fault operation disabling a faulty one of the plurality of stackable sub-converters, and a non-faulty one among the plurality of stackable sub-converters takes over operation of the faulty one;

wherein during the fault operation, the plurality of conversion control circuits record a fault phase sequence number according to the fault indication signal or the fault indication status, wherein the fault phase sequence number corresponds to a respective initial phase sequence number of the faulty one of the plurality of stackable sub-converters;

wherein the fault operation further includes controlling non-faulty ones among the plurality of stackable sub-converters to take over operation according to the fault phase sequence number; and wherein the faulty one among the plurality of stackable sub-converters transmits the fault indication signal or the fault indication status, and the non-faulty ones among the plurality of stackable sub-converters receive the fault indication signal or the fault indication status and operate according to the fault indication signal or the fault indication status.

14. The control method of claim 13, wherein the fault operation includes: controlling at least one switch of a power stage circuit of the faulty one of the plurality of stackable sub-converters to turn off, such that a switching terminal of an inductor of the faulty one is left floating.

15. The control method of claim 13, wherein the fault operation further includes:

controlling the fault indication signal or the fault indication status to indicate a reduction in an activated phase number based on a fault phase number; and controlling non-faulty ones among the plurality of stackable sub-converters to take over operation of faulty ones among the plurality of stackable sub-converters according to respective initial phase sequence numbers and the fault phase sequence number;

wherein the fault phase number corresponds to a number of faulty ones among the plurality of stackable sub-converters, and the activated phase number increases as a load current consumed by the load increases.

16. The control method of claim 13, wherein the plurality of pulses of the synchronization signal include a first predetermined level and a second predetermined level.

17. The control method of claim 16, further comprising:

generating a fault detection signal based on an abnormal circuit state of the faulty one among the plurality of stackable sub-converters; and modulating one of the plurality of pulses to generate a fault pulse based on the fault detection signal, such that the fault pulse includes the fault indication status;

wherein the abnormal circuit state includes an overcurrent protection (OCP) state, an over temperature protection (OTP) state, and at least one of an over voltage protection (OVP) state and an under voltage lock out (UVLO) state of the input power or a supply voltage, wherein the supply voltage is configured to provide power to the plurality of stackable sub-converters.

18. The control method of claim 17, wherein the fault indication status includes one of the following:

(1) the fault pulse transitions from the first predetermined level or the second predetermined level to a higher level;

(2) the fault pulse transitions from the first predetermined level or the second predetermined level to a lower level;

(3) a fault pulse width of the fault pulse is greater than a predetermined pulse width; or (4) the fault pulse width of the fault pulse is less than a predetermined pulse width;

wherein the higher level is higher than both the first predetermined level and the second predetermined level, and the lower level is lower than both the first predetermined level and the second predetermined level.

19. The control method of claim 17, further comprising:

generating the synchronization signal based on a synchronization input signal; and generating a modulation signal based on the fault detection signal, thereby modulating one of the plurality of pulse.

20. The control method of claim 13, further comprising: generating a reset signal during the normal operation to reset the count value when the count value corresponds to an activated phase number, wherein the activated phase number increases as a load current consumed by the load increases.

21. The control method of claim 20, wherein the fault operation further includes: generating the reset signal when the count value corresponds to a value obtained by subtracting a fault phase number from the activated phase number, wherein the fault phase number corresponds to a number of faulty ones among the plurality of stackable sub-converters.

* * * * *